Patented Mar. 9, 1943

2,313,338

UNITED STATES PATENT OFFICE

2,313,338

ELECTROLYTIC ZINC DUST PROCESS

William Henry Hannay and Basil Joseph Walsh, Trail, British Columbia, Canada, assignors to The Consolidated Mining & Smelting Company of Canada Limited, Montreal, Quebec, Canada, a company of Canada No Drawing. Application June 25, 1937, Serial No. 150,326

7 Claims. (Cl. 204—10)

Our invention relates to the production of electrolytic zinc dust and is particularly directed towards providing a process for the production of zinc dust having an extremely high precipitating efficiency when used as a precipitant and which is substantially free from impurities, thereby eliminating the contamination of other substances with which it comes in contact in ordinary industrial usages.

The industrial value of zinc dust is well established. Zinc dust is widely used as a precipitant of precious metals from cyanide solutions and also finds a market in the organic chemical industries wherein it is used as a reducing agent in neutral or in alkaline solutions in the manufacture of dye intermediates and the like.

In the former instance of its industrial application, it will be apparent that the zinc dust must have a high precipitating efficiency in addition to being substantially free from any impurities which would contaminate the precious metals with which it comes in contact. It will also be apparent that in use in the latter instance it must be substantially pure and of high reactivity.

Electrolytic methods of producing zinc dust of a high precipitating efficiency for the precipitation of precious metals from cyanide solutions have an advantage over electrothermic methods in view of certain disadvantages inherent in the latter process. For example, the high degree of precipitating efficiency, which zinc dust must have when it is used for this purpose, is possessed by substantially all the product obtained from the electrolytic process, whereas it may not be possessed by all the product from the electrothermic process.

When a particle of zinc dust is added to a solution containing soluble compounds of cyanide and precious metals, the surfaces of the zinc particle dissolve and precious metals deposit on those surfaces. Therefore, in order to obtain the greatest possible precipitating efficiency (i. e., the maximum dissolution of zinc in the shortest possible period of time), for a given weight of zinc dust, it is necessary that the particles should expose the greatest possible surface area in relation to their weight. Electrothermic zinc dust particles are spherical and smooth and, therefore, the smaller they are the more surface area do they expose and the greater is their precipitating efficiency per unit weight. Electrolytic zinc dust particles are not spherical but are usually dendritic and flat and, therefore, each particle has a far greater surface area than has a spherical particle of electro-thermic zinc dust of the same weight.

In the electro-thermic process, the zinc is distilled as a vapor which, on being condensed, forms a mist. The particles obtained from this process are graduated in size as a result of the varying stages of cooling to which the vapor is subjected. The finest dust particles, since they possess the highest degree of precipitating efficiency, may preferably be collected separately. The remainder of the product consists of coarser particles which would have too low a precipitating efficiency to meet the requirements of the cyanide process. In the case of zinc dust particles formed electrolytically, the entire product, regardless of its fineness as defined in the generally accepted sense of the term, is in a desirable condition for use in the cyanide process, the fineness of these dendritic particles being no criterion of their precipitating efficiency.

The principal disadvantage of the known electrolytic processes for the production of zinc dust is that costly electrolytes are required, such as relatively highly concentrated caustic soda solutions and the extraction of the zinc sponge formed at the cathode carries away appreciable amounts of the electrolyte which, on being washed out of the sponge, is diluted and not readily or cheaply recovered.

One of the principal features of our invention lies in the addition of an ammonium salt to the electrolyte which causes the deposited zinc to adhere to the cathodes, during their immersion in the electrolyte, in the form of a zinc sponge which may be readily removed and is in an ideal condition for the subsequent disintegrating step of the process. We have found, in this respect, that the ammonium ion may be added in the form of any of the well known ammonium salts such as ammonium sulphate, ammonium chloride and the like, either singly or in combination.

A further feature of our invention lies in the manner in which we control the hydrogen ion concentration (pH value) of the electrolyte to govern the deposition of the desired quality of zinc sponge.

Further features of our invention and the manner in which we attain them will be apparent from the following description.

The process is divided broadly into two steps consisting of (a) the production of the zinc sponge electrolytically and (b) the conversion of the zinc sponge into zinc dust.

Inasmuch as the first step of the process may be operated by alternative methods, i. e., by using a soluble zinc anode or an insoluble lead anode, it will be apparent that while the features and the scope of the invention are the same, the process must be operated in a different manner for each of the alternative methods.

Considering first the operation of the electrolytic cell in which soluble anodes are used and electrolytically decomposed, and in which the zinc, in a substantially pure state, is deposited on the cathode, we use an electrolyte comprising a dilute solution of ammonium sulphate which originally may contain no zinc but which will, under normal operating conditions, contain about 15 grams of zinc per litre. The zinc anode is quantitatively decomposed and the zinc is carried from the anodes through the electrolyte and deposited in the form of sponge upon the cathodes. The usual cathodes of iron or aluminum are well known and have been found to be satisfactory in our process.

The zinc sponge, resulting from the use of this electrolyte, adheres to the cathodes during their immersion in the electrolyte. The cathodes are withdrawn from the electrolyte periodically and the zinc sponge is scraped off, after which they are returned to the cell. It is not necessary to cut off the power to the cell during this operation provided more than one cathode is used per cell.

It will be apparent, of course, that there are other well known types of cathodes which may be used with satisfactory results such as the rotating circular cathode mounted on a horizontal shaft. Part of this cathode is immersed in the electrolyte and the sponge deposited thereon is scraped off as the cathode rotates and rises out of the electrolyte.

Referring now to the choice of electrolyte, it has been found that the presence of the ammonium ion is an extremely important factor in the formation of the zinc sponge. A good sponge formation will be obtained with an electrolyte containing ammonium salts such as sulphate, chloride, oxalate, acetate, citrate and the like.

It is clear, of course, that it would be undesirable to use an anion which would form an insoluble compound with the zinc ion and which, in removing the zinc ion from the electrolyte, would lower the current efficiency of the process.

In regard to the ammonium sulphate concentration in the electrolyte, we have found that a good sponge deposit may be formed when the electrolyte contains a concentration of from 10 grams per litre up to 200 grams per litre, but that the most desirable range of concentration is from 20–30 grams per litre wherein the best results are obtained, taking into consideration the quality of the deposit and the cost of the salt.

The current density is a matter of choice and good deposits of sponge zinc are formed using a current density ranging from 20 to 250 amperes per square foot.

The hydrogen ion concentration (pH value) of the electrolyte is of great importance and must be controlled in order to produce a good deposit of sponge zinc. In this respect it has been found in using a current density such as set out hereinbefore that the best deposit is formed when the hydrogen ion concentration is maintained between the lower limit where the bath is just acid to methyl-orange and the higher limit where precipitation occurs of zinc hydrate from the electrolyte or, more specifically, when the pH value lies between 4 and 7, with the most satisfactory value lying between 5.8 and 6. When the pH value is low there is a tendency to form metallic prills, which tendency increases when the bath becomes acid to methyl-orange. In order to control the hydrogen ion concentration within the desired range, small amounts of sulphuric acid are added in order to prevent the hydrogen ion concentration of the electrolyte reaching the point at which zinc hydrate would precipitate from it, that is, when the pH recorder would indicate that the electrolyte had reached a pH value of approximately 6.2.

Where the electrolyte consists initially of ammonium sulphate solution, the zinc content gradually builds up to about 15 grams of zinc per litre, at which point a current efficiency of from 85 to 90% is obtained. If desired, however, zinc sulphate may be added to the electrolyte prior to commencing electrolysis in order to obtain this current efficiency from the start.

During the operation of the process we prefer to maintain the temperature of the electrolyte within the range from 20° C. to 50° C. Coils may be inserted into the cells for cooling or heating in order to maintain these temperatures.

When the cathodes are removed from the cell and the zinc sponge adhering to them is detached therefrom, a certain amount of the electrolyte is entrained with the detached sponge. This is replenished by addition of a fresh supply of ammonium sulphate to the cell, either intermittently or continuously as desired, in amounts equivalent to the mechanical losses, which we have found to be in the neighborhood of 0.2 pound of ammonium sulphate for each pound of zinc sponge extracted.

Referring now to the alternative process in which insoluble anodes formed of lead are used, the zinc is introduced into the cell in the form of a substantially neutral solution preferably containing about 10 grams of zinc per litre and from 20 to 30 grams of ammonium sulphate per litre. The solution discharged from the cell, depleted in zinc ions, is replenished by neutralizing the acid with zinc oxide, after which it may be purified if necessary and returned to the cell as feed solution together with fresh ammonium sulphate in sufficient quantity to replace the losses incurred in the operation of the process.

In the operation of this embodiment of our invention, the zinc sponge is deposited on the cathode provided the electrolyte is neutral. If, however, the electrolyte is acid, a reguline deposit will be formed on the cathodes as they are replaced and the electrolysis continued.

It is necessary, therefore, to ensure that the cathodes are replaced in neutral electrolyte and while this can be accomplished in several ways, we prefer to employ a diaphragm type cell and to maintain the catholyte neutral and the anolyte acid. This is effected by circulating the electrolyte from the cathode compartment through or over the porous diaphragm into the anode compartment by maintaining a slight static head in the cathode compartment. The fresh neutral solution is added to the cathode compartment while the cell discharge solution is taken from the anode compartment.

As an alternative to the diaphragm cell, the electrolyte may be neutralized with ammonium hydroxide prior to replacing the scraped cathodes in the cell. In this instance the ammonium sulphate concentration of the electrolyte gradually rises, with the result that part of the solution must be withdrawn from the cell from time to time in order to maintain the correct ammonium sulphate concentration.

Referring now to the second step of the process, i. e., the conversion of zinc sponge to zinc dust, the zinc sponge removed from the cathodes is very susceptible to oxidation, particularly when sulphate is present, therefore the sponge is washed in a manner which avoids unnecessary contact with air, after which removal of excess moisture may be effected in any suitable manner. For this purpose we prefer to use a vacuum filter and then to transfer the zinc to a vacuum drier and thence to a disintegrator to break up the agglomerated particles, after which it is ready for market.

It will be clearly understood, of course, that modifications of the preferred embodiments of our invention hereinbefore described may be made without departing from the scope of the appended claims.

Having thus fully described our invention what we claim as new and desire to secure by Letters Patent is:

1. A process for the continuous electro-deposition of sponge zinc in a cell containing alternate insoluble positive electrodes and negative electrodes which comprises continuously electrolyzing a substantially neutral zinc sulphate solution containing from 10 to 15 grams of zinc per litre and from 20 to 30 grams of ammonium sulphate per litre and maintaining the neutrality and predetermined concentration of the electrolyte by the addition thereto of zinc oxide and ammonium sulphate.

2. A process for the production of sponge zinc which comprises electrolyzing a zinc sulphate electrolyte containing a soluble ammonium compound, the anion of which does not form an insoluble compound with the zinc ion, in a diaphragm type cell containing alternate insoluble positive electrodes and negative electrodes and depositing substantially pure sponge zinc therefrom by maintaining the catholyte in a substantially neutral condition and the anolyte in a substantially acid condition, adding fresh substantially neutral electrolyte to the catholyte and withdrawing acid solution from the anolyte.

3. A process for the production of zinc dust which comprises electrolyzing a zinc sulphate electrolyte containing a soluble ammonium compound, the anion of which does not form an insoluble compound with the zinc ion in a diaphragm type cell containing alternate insoluble positive electrodes and negative electrodes, maintaining the catholyte in a substantially neutral condition and the anolyte in a substantially acid condition, adding fresh, substantially neutral electrolyte to the catholyte and withdrawing acid solution from the anolyte, withdrawing the deposited sponge zinc from the electrolyte and disintegrating the sponge zinc particles under conditions which prevent atmospheric oxidation.

4. A process for the production of sponge zinc which comprises electrolyzing a zinc sulphate electrolyte containing from 20 to 30 grams ammonium sulphate per litre in a diaphragm type cell, containing alternate insoluble positive electrodes and negative electrodes, maintaining the catholyte in a substantially neutral condition and the anolyte in a substantially acid condition, adding fresh, substantially neutral electrolyte to the catholyte and withdrawing acid solution from the anolyte.

5. A process for the continuous electrodeposition of sponge zinc in a cell containing alternate insoluble positive electrodes and negative electrodes which comprises continuously electrolyzing a substantially neutral zinc sulphate electrolyte containing from 10 to 15 grams of zinc per litre and at least 10 grams per litre of a soluble ammonium compound, the anion of which does not form an insoluble compound with the zinc ion, whereby zinc is deposited in sponge form on the cathodes; maintaining the electrolyte in a substantially neutral condition by the addition thereto of zinc oxide and maintaining the ammonium ion concentration of the electrolyte above the predetermined minimum by the addition of the soluble ammonium compound.

6. A process for the production of zinc dust which comprises continuously electrolyzing a substantially neutral zinc sulphate electrolyte containing from 20 to 30 grams of ammonium sulphate per litre in a cell containing alternate insoluble positive electrodes and negative electrodes, and maintaining the neutrality and predetermined ammonium concentration of the electrolyte by withdrawing depleted electrolyte from the cell, replenishing the depleted electrolyte by neutralizing the acid content thereof with zinc oxide, replenishing the ammonium concentration of the depleted electrolyte by the addition thereto of ammonium sulphate and returning the replenished electrolyte to the cell, withdrawing the deposited sponge zinc and disintegrating the sponge zinc particles under conditions which prevent atmospheric oxidation.

7. A process for the production of zinc dust which comprises continuously electrolyzing a zinc sulphate electrolyte containing from 20 to 30 grams ammonium sulphate per litre in a diaphragm type cell containing alternate insoluble positive electrodes and negative electrodes, maintaining the catholyte in a substantially neutral condition and the anolyte in a substantially acid condition, adding fresh, substantially neutral electrolyte to the catholyte and withdrawing acid solution from the anolyte, withdrawing the deposited sponge zinc and disintegrating the sponge zinc particles under conditions which prevent atmospheric oxidation.

WILLIAM HENRY HANNAY.
BASIL JOSEPH WALSH.